RESOLUTION CONTROL OF THE THREE PRIMARY COLOR IMAGES IN
A SINGLE PICK-UP TUBE COLOR CAMERA SYSTEM

Filed July 3, 1968

INVENTORS S. Y. CHAI
L. H. ENLOE
A. B. LARSEN

BY John K. Mullarney

ATTORNEY

United States Patent Office 3,530,233

Patented Sept. 22, 1970

3,530,233

RESOLUTION CONTROL OF THE THREE PRIMARY COLOR IMAGES IN A SINGLE PICK-UP TUBE COLOR CAMERA SYSTEM

Soo Young Chai, Matawan, Louis H. Enloe, Holmdel, and Arthur B. Larsen, Colts Neck, N.J., assignors to Bell Telephone Laboratories, Incorporated, Murray Hill, N.J., a corporation of New York

Filed July 3, 1968, Ser. No. 742,439

Int. Cl. H04n *9/06*

U.S. Cl. 178—5.4 6 Claims

ABSTRACT OF THE DISCLOSURE

In a Kell-type single pick-up tube color camera system, a Christiansen filter is disposed in tandem with the striped color filters and out of the image plane thereof. The Christiansen filter comprises selected optical glass particles closely packed in a liquid whose index of refraction matches that of the glass particles near the center of the green optical frequency band; at red and blue optical frequencies the indices of refraction are mismatched.

BACKGROUND OF THE INVENTION

This invention relates to single pick-up tube color camera systems and more particularly to means for selectively controlling the resolution of the three primary color images therein.

The patent to R. D. Kell, No. 2,733,291, issued Jan. 31, 1956, describes a relatively simple single pick-up tube color camera system. A special optical arrangement using striped color filters is used to spatially modulate, in a sinusoidal fashion, two of the three primary color images, the three primary colors being red, green and blue. Scanning of the camera tube produces a composite video signal which comprises distinct carrier frequencies each modulated by information from a given primary color image. Bandpass filters are then used to separate the three individual primary color signals.

A basic limitation of color camera systems, such as that described, lies in the fact that existing camera tubes do not have adequate resolution. Hence, it is desirable that the spatial bandwidth of the color images be reduced in some selected fashion.

Now it has been found that the human eye cannot discriminate between a composite image composed of three sharp, wide bandwidth or high resolution color images and a composite image composed of a high resolution green image and low resolution red and blue images. This fact thus dictates the manner in which the desired reduction in spatial bandwidth should, preferably, be accomplished. That is, the resolution of the green primary image should remain sharp but yet controlled, with the resolution of the red and blue images reduced in a controlled fashion.

Numerous arrangements have been proposed for achieving the aforementioned reduction in spatial bandwidth. These typically are cumbersome and complex, or they are rather inefficient—i.e., large amounts of light are lost in the process of reducing or destroying the resolution of the red and blue images. The arrangements of Kell suffer in this latter regard.

SUMMARY OF THE INVENTION

It is accordingly an object of the present invention to selectively reduce the resolution of red and blue color images in a predetermined manner, while retaining a relatively sharp (i.e., high resolution) green image.

It is a further object of the invention that the reduction or destruction of the red and blue resolution be carried out in a simple yet highly efficient manner.

In accordance with the present invention, a specially designed Christiansen filter is advantageously utilized to achieve a light diffusion effect which is a predetermined function of optical frequency. That is, the diffusion properties of the filter are such that the resolution of the green primary image remains sharp but yet controlled while the resolution of the blue and red images is selectively reduced. To this end, selected optical glass particles are immersed in a liquid (e.g., ethyl salicilate) whose index of refraction substantially matches that of the particles over the green optical frequency band; at the red and blue optical frequencies the indices of refraction are mismatched.

In a Kell-type single tube color camera system, a diffusion filter having the above-described properties is placed in tandem with the striped color filters and not of the image plane thereof.

DETAILED DESCRIPTION

Figure 1:
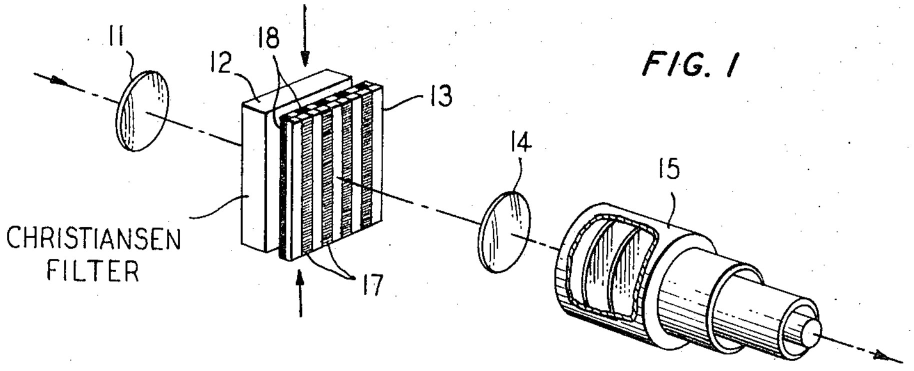
FIG. 1 is simplified, exploded perspective view of a Kell-type single pick-up tube color camera system including a diffusion filter in accordance with the present invention.

Turning now to FIG. 1 of the drawings, the light from an object scene passes through an object lens system, illustrated by lens 11, then through the Christiansen filter 12, to be described in detail hereinafter, and forms images on the light modulator 13. The relay lens 14, in turn, focuses the modulated images onto a suitable single aperture, image scanning device 15, which serves to generate electrical signals having characteristics that vary in a given manner in accordance with the variations in the intensity of light along the path scanned by the aperture. The image scanning device 15 may typically comprise an image orthicon pick-up tube having a photoelectric surface onto which object images are focused by relay lens 14.

As described in greater detail in the Kell patent, supra, the light modulator 13 is mounted in the image plane of the object lens system 11 and may include a first grid comprised of equally spaced parallel strips 17 that are optically negative to red light, and a second set of equally spaced parallel strips 18 that are optically negative to blue light. Accordingly, one set of strips passes green and blue light and is opaque to red, and the other set of strips passes green and red light but is opaque to blue. The negative red strips prevent red light from impinging on the photoelectric surface of the image scanning device at a first set of points along each line of the raster, and the negative blue strips prevent blue light from reaching a different spaced set of points along each line of the raster. The green light passes through all parts of light modulator 13 and hence strikes all areas of the photoelectric surface.

The number of red opaque strips 17 per unit length is different from the number of blue opaque strips 18 for the same length. Hence, the red and blue images are, in effect, optically or spatially modulated at different rates. Scansion of the beam of the image scanning device 15 will thus produce carrier waves of different frequencies which correspond to the respective optical modulation rates. And each carrier is, of course, amplitude modulated in accordance with the intensity variations of a different selected component color—i.e., in accordance with the red or blue primary color images. The red opaque and blue opaque gratings should be sufficiently different as to avoid spectrum overlap, and both resultant carriers must be higher than the highest video frequency of the green primary color signal. The composite output signal from the image scanning device 15 comprises a low frequency, baseband, green video signal and a pair of distinct carrier signals respectively modulated in accordance with the red and blue primary color images.

Now in accordance with the invention, the Christiansen filter 12 is placed in tandem with the light modulator 13 and, as indicated in FIG. 1, somewhat to the left of the real image plane, its positioning is not overly critical. The filter 12 is used to achieve a diffusion effect such that the resolution of green primary images remains sharp, yet controlled, while the resolution of blue and red images is reduced. In one specific embodiment of the invention, the Christiansen filter was composed of a mass of small random shaped particles immersed in a liquid whose index of refraction matched that of the particles at the green optical frequency and was mismatched at red and blue optical frequencies. Such a filter is effectively transparent at green optical frequencies so that the green images on the camera tube are sharp, with high resolution. At red and blue frequencies, on the other hand, scattering occurs and the resolution of red and blue images is reduced to the desired extent.

The aforementioned particles are preferably made of optical glass, such as type K manufactured by Jenar Glaswerk Schott & Gen., pulverized by a ball mill and of random shape, the size being approximately 30 to 100 microns. In a preferred embodiment of the invention, the dispersion constant (V) of the optical glass is 59.45. The dispersion constant (V) is defined as follows:

$$V=\frac{n_d-1}{n_f-n_c}$$

where $n_d$ is the index of refraction at $\lambda=5892.9$ A.
$n_f$ is the index of refraction at $\lambda=4861.3$ A.
$n_c$ is the index of refraction at $\lambda=6562.8$ A.

The optical glass particles are closely packed in a liquid, such as ethyl salicilate, with an index of refraction such as previously described.

Figure 3:
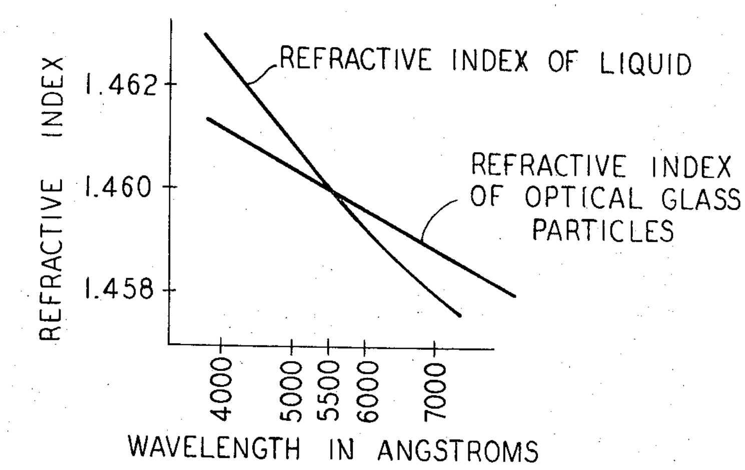
FIG. 3 illustrates typical refractive index versus wavelength curves of the materials comprising the diffusion filter.

FIG. 3 illustrates the refractive index versus wavelength curves of the materials comprising a diffusion filter constructed in accordance with the above-described preferred embodiment. As indicated in the figure, the indices of refraction are the same at 5500 A. (green) and they differ at frequencies of 4000–5000 A. (blue) and 6000–7000 A. (red).

Figure 2:
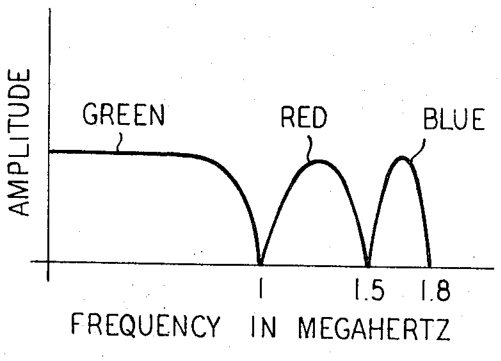
FIG. 2 illustrates the bandpass characteristics of the output signal derived in accordance with the invention.

FIG. 2 illustrates the bandpass characteristics of the output signal from the preferred embodiment. As one would expect from an examination of the curves of FIG. 3, the blue frequencies suffered greater diffusion and hence the blue bandpass is somewhat less than the red. The green bandpass characteristics depend on the difference in slopes of the two dispersion curves of FIG. 3.

As indicated in the article entitled, "Fast Variable Color Filter," by E. Matovich, I.S.A. Journal, December 1965, pages 53 through 55, the application of pressure on a Christiansen filter causes its peak transmission wavelength to change. Accordingly, having constructed a filter as described, pressure can be applied, as indicated by the arrows in FIG. 1, so that the refractive index versus wavelength curves intersect at the desired point—in the instant case at 5500 A. This permits some degree of flexibility in the construction of the filter.

A Christiansen filter can be constructed of materials other than those specified above (see the Matovich article). Accordingly, while the specified materials comprise a preferred embodiment of the invention, the latter should in no way be considered as limited htereto.

The resolution need only be selectively destroyed in one direction—i.e., the horizontal direction, which is the direction of the beam scansion. Hence, the scattering bodies need only scatter in the horizontal direction. The scattering bodies can, therefore, comprise elongated or vertically extending fibers of optical glass or the equivalent and these can be of any selected cross-section (e.g., round, square, etc.).

The red, green and blue primary color system is the one most often encountered in the art. However, other color systems have been proposed heretofore—such as cyan, yellow and magenta. It must be evident, therefore, that the present invention is in no way limited to a red, green and blue primary color arrangement and it may find application in any other color system wherein the resolution of one color must remain sharp, while the others are selectively reduced.

For the above reasons, it is to be understood that the foregoing disclosure is merely illustrative of the application of the principles of the present invention and numerous modifications or alternations may be devised by those skilled in the art without departing from the spirit and scope of the invention.

What is claimed is:

1. A single tube color camera system comprising an image scanning device, striped color filter means disposed in the light path of said image scanning device and serving to spatially modulate at least two of three selected primary color images, and a diffusion filter disposed in tandem with said color filter means out of the image plane thereof, said diffusion filter comprising transparent solid bodies immersed in a liquid whose index of refraction matches that of the solid bodies at the optical frequency of one of the three primary colors and is mismatched at the optical frequencies of the other two primary colors.

2. A color camera system as defined in claim 1 wherein the three primary colors are red, green and blue and the color filter means serves to spatially modulate red and blue primary color images.

3. A color camera system as defined in claim 2 wherein the solid bodies are optical glass particles packed in said liquid, with the index of refraction of said liquid matching that of said particles at green optical frequency and being mismatched at the red and blue optical frequencies.

4. A color camera system as defined in claim 3 wherein the optical glass particles are of random shape and of a size of thirty to one hundred microns.

5. A color camera system as defined in claim 4 wherein the dispersion constant of the optical glass is 59.45 and the liquid is ethyl salicilate.

6. A single tube color camera system comprising an image scanning device, striped color filter means disposed in the light path of said image scanning device and serving to spatially modulate all but one of at least two selected primary color images, and a diffusion filter disposed in tandem with said color filter means somewhat out of the image plane thereof, said diffusion filter comprising transparent solid bodies immersed in a liquid whose index of refraction matches that of the solid bodies at the optical frequency of one of said primary colors and is mismatched at the optical frequencies of the other primary colors.

References Cited

UNITED STATES PATENTS

| | | |
|---|---|---|
| 2,733,291 | 1/1956 | Kell. |
| 2,748,189 | 5/1956 | Bedford. |
| 2,827,512 | 3/1958 | Stahl et al. |

RICHARD MURRAY, Primary Examiner